United States Patent
Shinjo

(10) Patent No.: US 6,761,268 B2
(45) Date of Patent: Jul. 13, 2004

(54) SCREW-HOLDING BELT

(75) Inventor: Katsumi Shinjo, Osaka (JP)

(73) Assignee: Yugenkaisha Shinjo Seisakusho, Osaka (JP)

( * ) Notice: Subject to any disclaimer, the term of this patent is extended or adjusted under 35 U.S.C. 154(b) by 0 days.

(21) Appl. No.: 10/441,011

(22) Filed: May 20, 2003

(65) Prior Publication Data

US 2003/0213712 A1 Nov. 20, 2003

(30) Foreign Application Priority Data

May 20, 2002 (JP) .................................... 2002-144517

(51) Int. Cl.[7] .............................................. B65D 85/24
(52) U.S. Cl. ........................................ 206/346; 206/347
(58) Field of Search ........................ 206/338, 341–347, 206/820; 411/441, 442, 443, 444

(56) References Cited

U.S. PATENT DOCUMENTS

| | | | | |
|---|---|---|---|---|
| 5,522,687 A | * | 6/1996 | Chen | 206/347 |
| 5,544,746 A | * | 8/1996 | Dohi | 206/346 |
| 5,775,514 A | * | 7/1998 | Lin | 206/347 |
| 5,779,420 A | * | 7/1998 | Huang | 206/347 |
| 5,913,421 A | * | 6/1999 | Shinjo | 206/347 |
| 5,931,298 A | * | 8/1999 | Huang | 206/346 |
| 5,984,096 A | * | 11/1999 | Shinjo | 206/347 |

* cited by examiner

*Primary Examiner*—Luan K. Bui
(74) *Attorney, Agent, or Firm*—Antonelli, Terry, Stout & Kraus, LLP

(57) ABSTRACT

A screw-holding belt (20) has a belt body (2) made from a plastics and having cutouts (8) that are formed at a pitch 'P' in and along side edges of the belt body so as to intermittently drive it. Passage holes (5) are formed at the same pitch as the cutouts in order to eject the screws (15), and have a diameter larger than their heads or washers. Screw-holding cylinders (3) are formed each in and coaxial with the central region passage hole (5), so that each screw's threaded leg is inserted into and held in the cylinder. Four stays (21) continue from the rim of upper opening (4) of each cylinder and extend outwards to the inner periphery of passage hole (5) in radial directions each intersecting the center line of belt body (2), so that the belt body can smoothly advance to eject the screws, without suffering from any trouble even if their heads or washers are of a large diameter.

2 Claims, 3 Drawing Sheets

SCREW-HOLDING BELT

FIELD OF THE INVENTION

The present invention relates to a belt that holds thereon a row of self-drilling screws or the like each having a head with a sealing washer attached thereto such that the head of each screw is considerably larger than those of ordinary screws, wherein the belt will successively carry the screws into a power-driven screw driver for driving and fastening them into the portions of articles overlying one another.

PRIOR ART

The present applicant proposed a certain belt of this type as disclosed in the Gazette of Japanese Patent No. 2880703, and this belt was adapted to temporarily hold and carry a number of screws each having a relatively large head.

Such a belt of the applicant's previous proposal has however involved a problem, if its standard belt body had to hold thereon much larger screws each with a sealing washer, as will be summarized below.

FIGS. 5 and 6 illustrate the previous type of screw-holding belt, wherein a belt body 2 is typically 20 mm–22 mm wide and made of a proper plastics. Conical cylinders 3 for holding headed-screws are formed in and along the belt body 2 at a given pitch 'P', and each self-drilling screw 15 having for example a sealing washer 16 attached thereto is of an outer diameter of 16 mm $\phi$. This screw-holding belt 1 of the U.S. Pat. No. 2,880,703 will be fed to an automatic screw fastener so as to move towards it intermittently by the pitch 'P' such that the screws are released one by one from the belt body 2.

Arranged longitudinally of the belt body 2 at the pitch 'P' are latent passage holes 5 each composed of a quartet of apertures whose circumcircle is of a diameter larger than the outer diameter of each sealing washer 16 so that the screw head can be pushed out through the belt. Each screw-holding cylinder 3 is formed in and coaxial with a central region of the corresponding latent passage hole 5. Four stays 6 continue radially and outwardly from the upper rim of a central opening 4 to the inner periphery of such a latent passage hole 5. Each stay 6 intervenes between the two adjacent apertures, so that each cylinder 3 is normally kept in place by such stays 6. Two slits 7 and 7 formed in the rim of opening 4 are located beside and close to the inner end of each stay 6 so as to assist it to be torn from the cylinder. On the other hand, rows of cutouts 8 formed at the pitch 'P' in and along the opposite lateral sides of the belt body 2 will serve to intermittently drive it to advance in the direction 'X' by pitch 'P'. A belt guide 9 has, as shown in FIG. 6, a vertical slot 10 that is formed in a central region of the belt guide so that a screw driver 13 can reciprocate up and down through said slot. A guide grooves 11 facing one another and also formed in said guide 9 are located beneath the vertical slot 10. The opposite lateral side edges of belt body 2 will fit in the respective guide grooves 11 so as to be guide through them when the body advances. A ledge and a cover overlying it to form each guide groove 11 have their central regions cut out to provide a screw releasing cavity 12, which is disposed below the lower opening of vertical slot 10. The screw driver 13 will reciprocate up and down rectangularly to the belt body 2 so that a driving bit of the driver engages with the head 17 of the self-drilling screw 15, forcing it away from said body 2. With the screw 15 thus being forced through and off the belt body, its screw-holding cylinder 3 will be broken by the head 17 and sealing washer 16 of a screw just being released, along the slits 7 and as shown at the right-hand end zone of FIG. 5.

In the screw-holding belt 1 of U.S. Pat. No. 2,880,703, two of the four stays 6A and 6B extend along the longitudinal center line of the belt body 2, with the other two stays 6C and 6D extending transversely of this body. Those transverse stays 6C and 6D will surely be supported in place by the belt guide 9 during the step of ejecting the self-drilling screw 15 out of the belt. In contrast with such transverse stays, the longitudinal stays 6A and 6B are not sustained at all while the screw driver 13 is ejecting the screw through the releasing cavity 12 of said belt guide 9. As a result, such longitudinal stays 6A and 6B will tend to swell out as the washer 16 and head 17 of each screw 15 is pushed out through the belt body 2. In particular, one of the longitudinal stays 6B of the succeeding cylinder 3 located at the leading side of the screw being ejected, does directly continue to the trailing side longitudinal stays 6A' of preceding cylinder 3 that has been torn off therefrom due to ejection of the preceding screw 15. Thus, as will be seen in FIG. 6, the preceding stay 6A' tends to accompany the succeeding stay 6B that is being forced out, collapsing it too lightly. Consequently, the belt body 2 has deformed itself often to cause a certain trouble that it could not smoothly be driven forwards any longer, disabling ejection of all the succeeding screws 15. The larger the outer diameter of those heads 17 and washers 16, the more likely this trouble takes place.

SUMMARY OF THE INVENTION

The present invention that was made to resolve such a problem does provide such a screw-holding belt that its belt body can smoothly be driven to advance longitudinally when ejecting screws, without suffering from any trouble even if the screws have heads and/or washers of a considerably large outer diameter.

In order to achieve this object, a screw-holding belt provided herein to temporarily hold thereon a row of headed screws will comprise a belt body made from a plastics and having a row of cutouts that are formed at a given pitch in and along at least one of opposite lateral side edges of the belt body, with the cutouts serving for intermittent feed thereof, and latent passage holes formed at the same pitch as the cutouts and arranged longitudinally of said belt body. Each passage hole permitting the screw to be pushed off the belt body is of a diameter larger than the outer diameter of a head or the diameter of a washer attached to the neck of each headed screw. This screw-holding belt further comprises screw-holding cylinders each formed in and coaxial with a central region of the corresponding latent passage hole, whereby a threaded leg of each headed screw can be inserted into and sustained in the cylinder, and four stays that continue from a rim defining the upper opening of each cylinder and continue to an inner periphery of the corresponding latent passage hole. Characteristic to this screw-holding belt is a structural feature that all of the four stays extend radially and outwardly in directions each intersecting a longitudinal center line of the belt body at a given angle.

Preferably, the given angle may be about 45 degrees for each of the four stays, such that they assume as a whole the letter 'X'.

Such a layout of the four stays for suspension of each screw-holding cylinder will be advantageous in that the outer or basal end of each stay is located near either side edge of the belt body. In use, all the basal ends of such stays will be supported in a belt guide during every step of ejecting the screw, such that an ejecting force is applied uniformly to these stays. The screw-holding cylinders can now be separated smoothly one by one from the belt body, without undesirably deforming it as a whole. Even screws whose heads or washers attached to their necks are of a considerably large outer diameter can be pushed out smoothly from the belt body.

THE PREFERRED EMBODIMENTS

Figure 1:
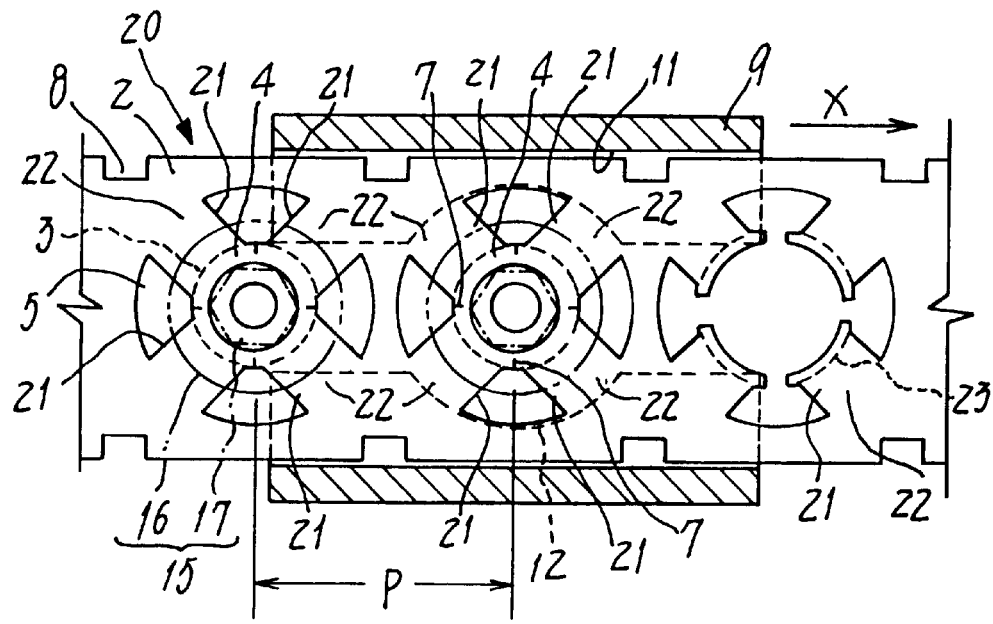
FIG. 1 is a plan view of a screw-holding belt provided herein and shown in use together with a belt guide, that is illustrated as a horizontal cross section.

Now some embodiments of the present invention will be described in detail, referring to the drawings.

Figure 2:
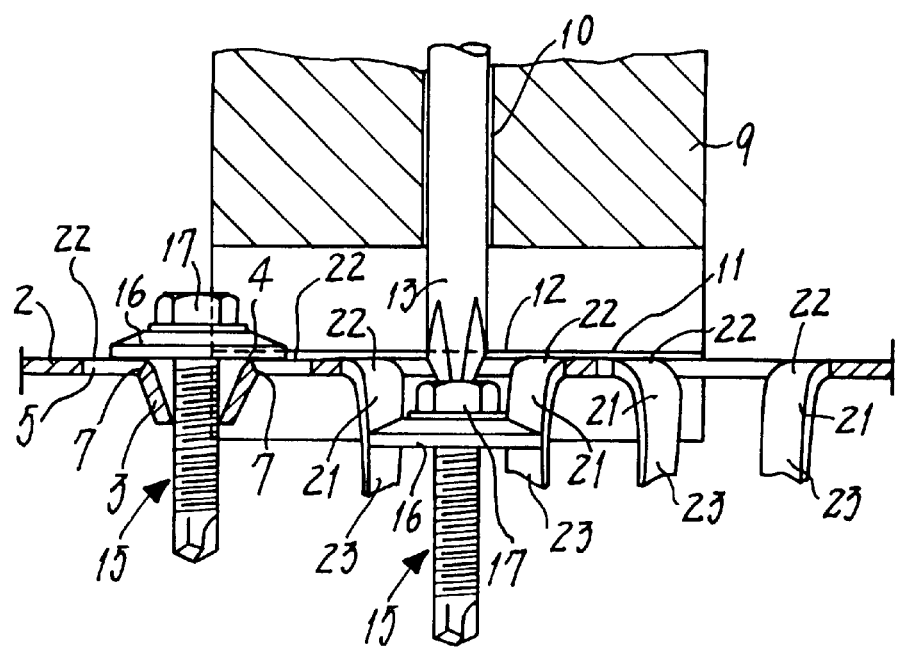
FIG. 2 is a cross-sectional front elevation corresponding to FIG. 1.
Figure 3:
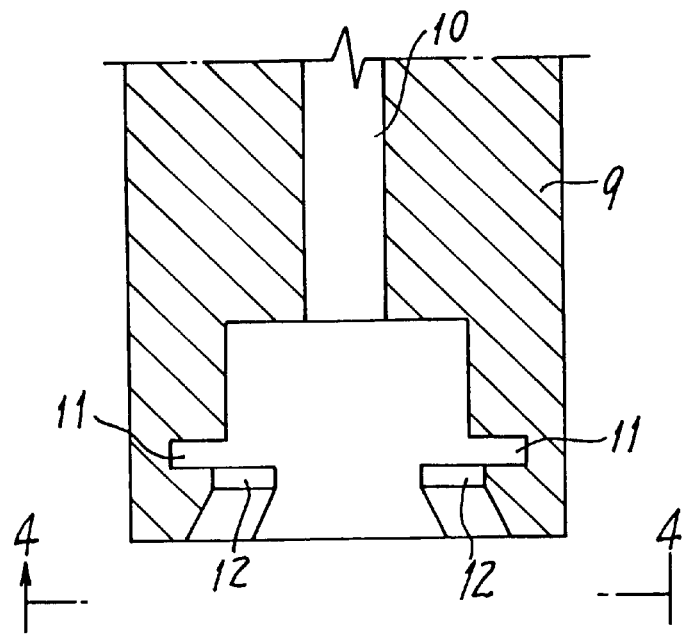
FIG. 3 is a cross-sectional side elevation of the belt guide.
Figure 4:
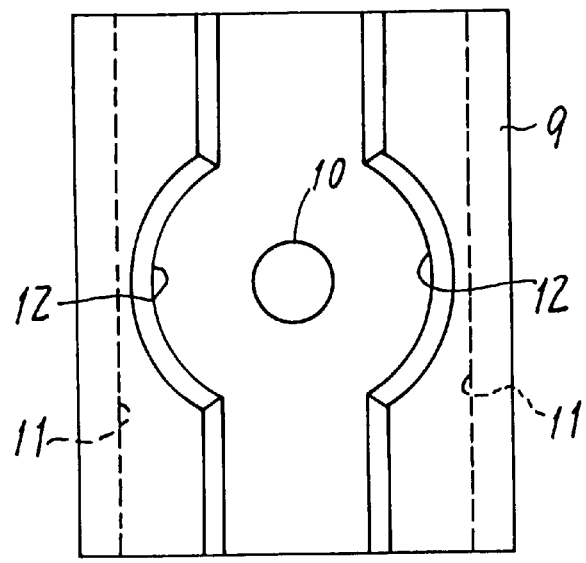
FIG. 4 is a cross section taken along the line 4—4 in FIG. 3.
Figure 5:
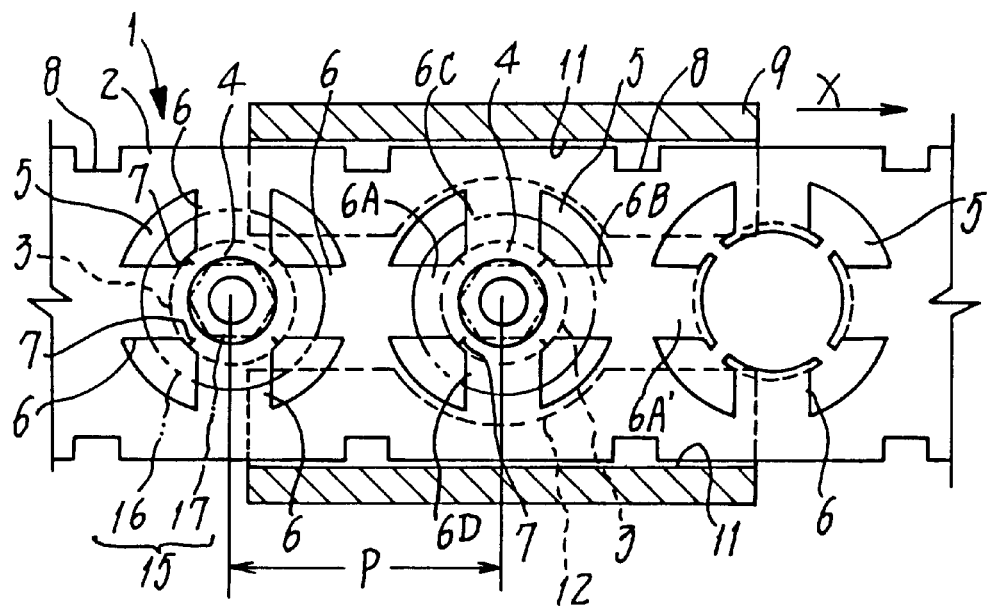
FIG. 5 is a plan view of the prior art screw-holding belt shown in use together with the belt guide, that is illustrated as a horizontal cross section.
Figure 6:
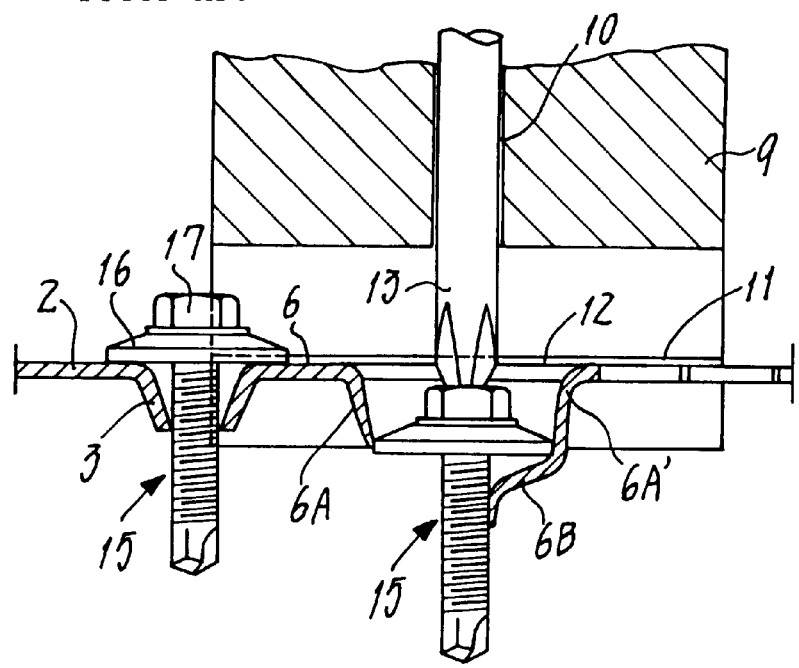
FIG. 6 is a cross-sectional front elevation corresponding to FIG. 5.

FIGS. 1 and 2 show a screw-holding belt 20 provided herein to hold thereon a row of self-drilling screws, with the belt having been fed to an automatic screw fastening apparatus. A belt body 2 of this screw-holding belt is being driven to intermittently advance through the apparatus at a pitch 'P' so as push the screws one by one out of the belt body. Constituent parts identical or similar to those included in the prior art belt shown in FIGS. 5 and 6 are not described here but indicated simply by the same reference numerals allocated to them.

The screw-holding belt 20 shown in FIGS. 1 and 2 is made from a plastics such as a polypropylene or a polyethylene. Four stays 21 sustain each screw holding cylinder 3 and respectively extend in directions intersecting a longitudinal center line of the belt body 2 at an angle of 45 degrees, thus assuming the letter 'X' as a whole. The basal end 22 of each stay is located near either side edge of the belt body 2 so as to be supported in and by a belt guide 9. A screw driver 13 will push and eject the self-drilling screw 15 that has arrived at a screw releasing cavity 12 within the belt guide 9. A force which the screw driver 13 exerts will be applied evenly to all the four stays 21, so that the screw-holding cylinder 3 is broken along the slits 7 to form segments 23 substantially of the same width. As seen in FIG. 2, each segment 23 and one of those stays 21 continuing therefrom will be bent integrally and in unison at the basal end 22 serving as a fulcrum. Thus, there is no fear of undesirably deforming the belt body 2, when ejecting therefrom the self-drilling screws 15.

It will now be apparent that the screw-holding belt of the present invention can operate to easily and smoothly eject the screws, without causing any deformation of its belt body, even if they have heads and/or washers of a considerably large outer diameter.

What is claimed is:

1. A screw-holding belt for temporarily holing thereon a row of headed screws, the belt comprising:

a belt body made from a plastics and having a row of cutouts that are formed at a given pitch in and along at least one of opposite lateral side edges of the belt body, the cutouts serving for intermittent feed of the belt body during use thereof, latent passage holes formed at the same pitch as the cutouts and arranged longitudinally of the belt body, each passage hole permitting the screw to be pushed off said belt body and being of a diameter larger than an outer diameter of a head or a washer attached to a neck of each headed screw below the head, screw-holding cylinders each formed in and coaxial with a central region of the corresponding latent passage hole, so that a threaded leg of each headed screw is capable of insertion into in the cylinder to be sustained therein, and four stays that continue from a rim defining an upper opening of each cylinder and extend to an inner periphery of the corresponding latent passage hole, wherein all of the four stays extend radially and outwardly in directions each intersecting a longitudinal center line of the belt body at a given angle.

2. A screw-holding belt as defined in claim 1, wherein the given angle is about 45 degrees for each of the four stays, such that they assume as a whole the alphabetical letter 'X'.

* * * * *